United States Patent
Miyashita

(10) Patent No.: US 8,983,138 B2
(45) Date of Patent: Mar. 17, 2015

(54) IMAGE PROCESSING DEVICE, INFORMATION STORAGE DEVICE, AND IMAGE PROCESSING METHOD

(71) Applicant: Olympus Corporation, Tokyo (JP)

(72) Inventor: Naoyuki Miyashita, Tokyo (JP)

(73) Assignee: Olympus Corporation, Tokyo (JP)

( * ) Notice: Subject to any disclaimer, the term of this patent is extended or adjusted under 35 U.S.C. 154(b) by 76 days.

(21) Appl. No.: 13/740,521

(22) Filed: Jan. 14, 2013

(65) Prior Publication Data

US 2013/0129153 A1  May 23, 2013

Related U.S. Application Data

(63) Continuation of application No. PCT/JP2011/066033, filed on Jul. 14, 2011.

(30) Foreign Application Priority Data

Jul. 15, 2010  (JP) .................................. 2010-160624

(51) Int. Cl.
 G06K 9/00 (2006.01)
 G06F 17/30 (2006.01)
 H04N 5/76 (2006.01)

(52) U.S. Cl.
 CPC .... G06F 17/30268 (2013.01); G06F 17/30265 (2013.01)
 USPC .......................... 382/106; 382/224; 348/231.2

(58) Field of Classification Search
 USPC ......... 382/100, 103, 112, 155, 162, 168, 173, 382/192, 206, 209, 219, 224, 232, 254, 274, 382/276, 286–291, 305, 312, 106; 348/231.2, 231.7; 345/629
 See application file for complete search history.

(56) References Cited

U.S. PATENT DOCUMENTS

| | | | |
|---|---|---|---|
| 5,164,831 A * | 11/1992 | Kuchta et al. | 348/231.7 |
| 7,663,671 B2 * | 2/2010 | Gallagher et al. | 348/231.2 |
| 7,991,234 B2 * | 8/2011 | Hamasaki et al. | 382/224 |
| 2010/0149212 A1 * | 6/2010 | Fukuya et al. | 345/629 |
| 2011/0280447 A1 * | 11/2011 | Conwell | 382/103 |

FOREIGN PATENT DOCUMENTS

| | | |
|---|---|---|
| JP | 2005-174060 A | 6/2005 |
| JP | 2006-101095 A | 4/2006 |

(Continued)

OTHER PUBLICATIONS

Japanese Office Action dated Nov. 26, 2013 (and English translation thereof) in counterpart Japanese Application No. 2010-160624.

(Continued)

Primary Examiner — Seyed Azarian
(74) Attorney, Agent, or Firm — Holtz, Holtz, Goodman & Chick PC

(57) ABSTRACT

An image processing device includes an information acquisition section that acquires a photographing position of a photographed image or a position of an imaging device as coordinate information, a distribution state acquisition section that acquires a distribution state of a plurality of pieces of coordinate information acquired as the coordinate information, and a keyword assignment section that assigns a keyword that corresponds to the acquired distribution state to the photographed image.

19 Claims, 8 Drawing Sheets

(56) References Cited

FOREIGN PATENT DOCUMENTS

| | | |
|---|---|---|
| JP | 2007-257312 A | 10/2007 |
| JP | 2008-097147 A | 4/2008 |
| JP | 2008-242639 A | 10/2008 |
| JP | 2009-036594 A | 2/2009 |
| JP | 2010-140383 A | 6/2010 |

OTHER PUBLICATIONS

International Search Report dated Aug. 23, 2011 (in English) in counterpart International Application No. PCT/JP2011/066033.

* cited by examiner

FIG. 6
| IMAGE DATA | COORDINATE INFORMATION | KEYWORD | |
|---|---|---|---|
| G1 | (X1, Y1) | K1 | ← A1 |
| G2 | (X2, Y2) | K2 | |
| NULL | (X3, Y3) | K3 | ← A2 |
| ⋮ | ⋮ | ⋮ | |
FIG. 7
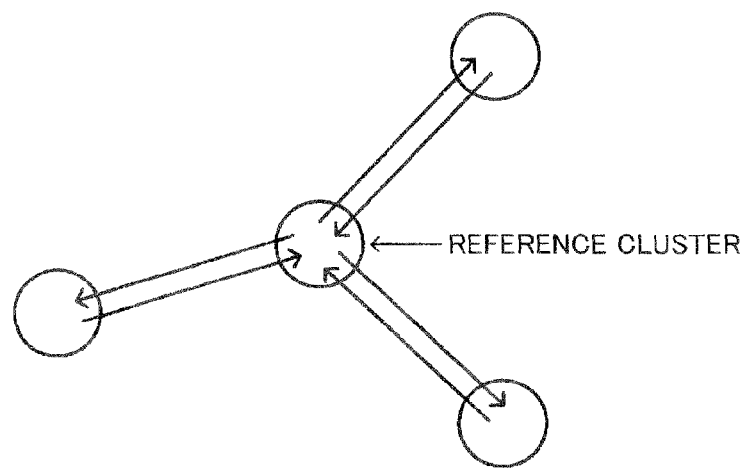
FIG. 8A
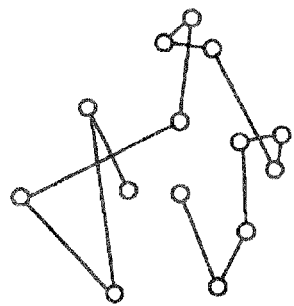
FIG. 8B
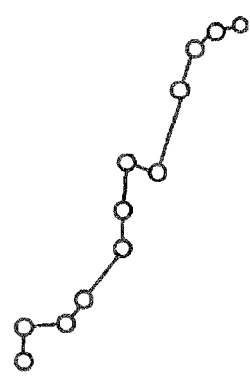

IMAGE PROCESSING DEVICE, INFORMATION STORAGE DEVICE, AND IMAGE PROCESSING METHOD

CROSS REFERENCE TO RELATED APPLICATION

This application is a continuation of International Patent Application No. PCT/JP2011/066033, having an international filing date of Jul. 14, 2011, which designated the United States, the entirety of which is incorporated herein by reference. Japanese Patent Application No. 2010-160624 filed on Jul. 15, 2010 is also incorporated herein by reference in its entirety.

BACKGROUND

The present invention relates to an image processing device, an information storage device, an image processing method, and the like.

In recent years, a keyword (metadata) has been extensively assigned to an image in order to implement an image search. The keyword assignment approach is roughly classified into an approach that extracts a feature quantity from an image, and utilizes the type of object determined by image recognition as a keyword, and an approach that utilizes a camera parameter (Exif, GPS, or sensor).

JP-A-2008-242639 discloses a method that assigns a keyword that represents a place name and is provided in advance to an image using position information acquired when photographing an image.

SUMMARY

According to one aspect of the invention, there is provided an image processing device comprising:

an information acquisition section that acquires a photographing position of a photographed image or a position of an imaging device as coordinate information;

a distribution state acquisition section that acquires a distribution state of a plurality of pieces of coordinate information acquired as the coordinate information; and a keyword assignment section that assigns a keyword that corresponds to the acquired distribution state to the photographed image.

According to another aspect of the invention, there is provided an information storage device storing a program that causes a computer to function as:

an information acquisition section that acquires a photographing position of a photographed image or a position of an imaging device as coordinate information;

a distribution state acquisition section that acquires a distribution state of a plurality of pieces of coordinate information acquired as the coordinate information; and a keyword assignment section that assigns a keyword that corresponds to the acquired distribution state to the photographed image.

According to another aspect of the invention, there is provided an image processing method comprising:

acquiring a photographing position of a photographed image or a position of an imaging device as coordinate information;

acquiring a distribution state of a plurality of pieces of coordinate information acquired as the coordinate information; and assigning a keyword that corresponds to the acquired distribution state to the photographed image.

BRIEF DESCRIPTION OF THE DRAWINGS

FIG. 6 illustrates a data configuration example of image data, coordinate information, and a keyword.

FIG. 7 is a view illustrating a reference cluster determination process based on the time-series transition history of coordinate information.

FIG. 8A illustrates an example in which the complexity of the distribution of coordinate information is high, and FIG. 8B illustrates an example in which the complexity of the distribution of coordinate information is low.

DESCRIPTION OF EXEMPLARY EMBODIMENTS

Figure 1:
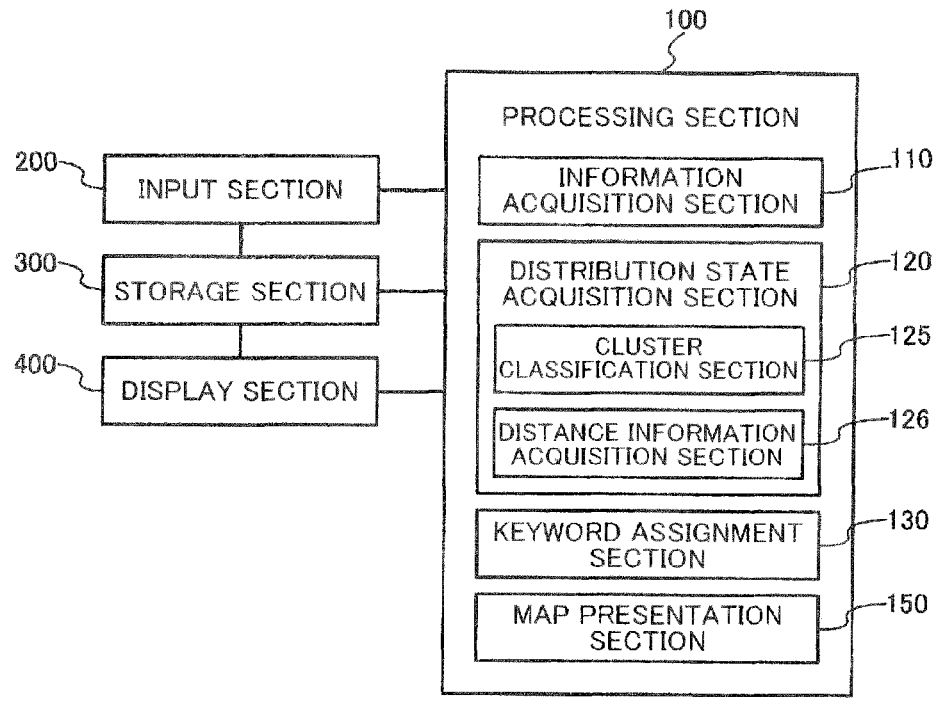
FIG. 1 illustrates a configuration example of an image processing device.

According to one embodiment of the invention, there is provided an image processing device comprising:

an information acquisition section that acquires a photographing position of a photographed image or a position of an imaging device as coordinate information;

a distribution state acquisition section that acquires a distribution state of a plurality of pieces of coordinate information acquired as the coordinate information; and a keyword assignment section that assigns a keyword that corresponds to the acquired distribution state to the photographed image.

According to the image processing device, it is possible to assign a keyword that corresponds to the distribution state of the coordinate information to the photographed image by acquiring the coordinate information and the distribution state of the coordinate information. This makes it possible to assign a keyword that reflects the preference or the like of the user.

In the image processing device, the distribution state acquisition section may acquire the distribution state of the coordinate information in a two-dimensional coordinate space that represents a geographical position.

This makes it possible to acquire a geographical position (e.g., longitude/latitude) as the coordinate information, and acquire the distribution state of the coordinate information.

In the image processing device, the information acquisition section may further acquire time information that is information that indicates a time when the photographing position of the photographed image or the position of the imaging device has been acquired, the distribution state acquisition section may acquire the distribution state of the coordinate information and the time information in a three-dimensional coordinate space that includes two-dimensional coordinates that represent a geographical position, and a third axis that represents time, and the keyword assignment section may assign a keyword that represents information about time to the photographed image.

This makes it possible to acquire the distribution state of the three-dimensional information that takes account of the geographical position and the time axis, and assign a keyword that corresponds to the acquired distribution state to the photographed image, for example.

In the image processing device, the distribution state acquisition section may include a cluster classification section that classifies the coordinate information into a plurality of clusters that include at least a first cluster and a second cluster.

This makes it possible to classify the coordinate information into a plurality of clusters using the clustering process.

In the image processing device, the cluster classification section may classify the first cluster and the second cluster into a reference cluster that serves as a reference and a non-reference cluster that does not serve as a reference.

This makes it possible to classify the coordinate information into the reference cluster and the non-reference cluster, and assign a keyword that reflects the preference or the like of the user.

In the image processing device, the cluster classification section may classify a cluster among the plurality of clusters that includes a largest number of the photographed images as the reference cluster.

This makes it possible to set the reference cluster using a simple method that counts the number of images included in the cluster.

In the image processing device, the cluster classification section may set the reference cluster based on selection by a user.

This makes it possible allow the user to select the reference cluster.

In the image processing device, the cluster classification section may set the reference cluster based on a time-series transition history of the coordinate information in a two-dimensional coordinate space that represents a geographical position.

This makes it possible to automatically set the reference cluster around a point (hub) with the largest number of passages based on the time-series transition history, for example.

In the image processing device, the cluster classification section may set the reference cluster based on a complexity of a distribution of coordinates in the first cluster indicated by the coordinate information and a complexity of a distribution of coordinates in the second cluster indicated by the coordinate information.

This makes it possible to automatically set the reference cluster based on the complexity of the distribution of the coordinate information in the cluster.

The image processing device may further comprise: a map presentation section that displays a thumbnail of a plurality of images acquired as the photographed image on a map, the map presentation section may display a single representative image among the plurality of images on the map as the thumbnail when a geographical distance between the photographing positions is less than a given threshold value, and may set the threshold value that corresponds to the non-reference cluster to be larger than the threshold value that corresponds to the reference cluster.

According to the above configuration, since the images widely distributed in the non-reference cluster are represented by a single thumbnail (or a few thumbnails), it is possible to allow the user to recognize that the images represent a series of events.

In the image processing device, the keyword assignment section may assign a place name that represents a narrow region to the photographed image included in the reference cluster as compared with the photographed image included in the non-reference cluster when assigning a place name that corresponds to the photographing position to a plurality of images acquired as the photographed image as the keyword.

According to the above configuration, since a detailed place name is assigned to the image included in the reference cluster, and a broad place name is assigned to the image included in the non-reference cluster, it is possible to provide a more convenient system, for example.

In the image processing device, the information acquisition section may further acquire time information that is information that indicates a time when the photographing position of the photographed image or the position of the imaging device has been acquired, the distribution state acquisition section may acquire the distribution state of the coordinate information and the time information in a three-dimensional coordinate space that includes two-dimensional coordinates that represent a geographical position, and a third axis that indicates time, and the keyword assignment section may change a threshold value used to determine a temporal distance depending on whether a cluster is the reference cluster or the non-reference cluster when assigning a keyword that represents information about time to the photographed image.

According to the above configuration, since the threshold value can be changed depending on whether the cluster is the reference cluster or the non-reference cluster, it is possible to assign a keyword appropriate for the impression of the user.

In the image processing device, the information acquisition section may further acquire time information that is information that indicates a time when the photographing position of the photographed image or the position of the imaging device has been acquired, the distribution state acquisition section may acquire the distribution state of the coordinate information and the time information in a three-dimensional coordinate space that includes two-dimensional coordinates that represent a geographical position, and a third axis that indicates time, and the cluster classification section may classify a cluster that has been set to be the non-reference cluster as the reference cluster when a consecutive photographing time of images included in the non-reference cluster has become equal to or more than a given threshold value.

According to the above configuration, it is possible to automatically change the type of the cluster even when the normal activity range of the user has changed due to a move or the like.

In the image processing device, the distribution state acquisition section may include a distance information acquisition section that acquires distance information about the plurality of clusters, and the keyword assignment section may assign the keyword to the photographed image based on the distance information.

This makes it possible to assign a keyword based on the cluster-to-cluster distance, for example In the image processing device, the distribution state acquisition section may include a distance information acquisition section that acquires distance information about the plurality of clusters, and the keyword assignment section may assign a keyword that represents a long distance in a coordinate space to the photographed image included in the non-reference cluster when a distance between the reference cluster and the non-reference cluster indicated by the distance information is long.

This makes it possible to assign a keyword that represents a long distance in the coordinate space to the photographed image when the distance between the reference cluster and the non-reference cluster is long. Therefore, it is possible to assign a keyword that reflects the preference or the like of the user based on the distance information.

In the image processing device, the distribution state acquisition section may include a cluster classification section that classifies the coordinate information into a plurality of clusters that include at least a first cluster and a second cluster, and the cluster classification section may classify one or more clusters among the plurality of clusters as a reference cluster, and may classify remaining clusters among the plurality of clusters as a non-reference cluster.

This makes it possible to assign an appropriate keyword even when the photographing positions are distributed over a wide range, for example.

In the image processing device, the distribution state acquisition section may include a cluster classification section that classifies the coordinate information into a plurality of clusters that include at least a first cluster and a second cluster, and the cluster classification section may classify the plurality of clusters into a reference cluster and a non-reference cluster by calculating a representative position of each cluster among the plurality of clusters, and performing a clustering process again while regarding each cluster among the plurality of clusters as a point that corresponds to the representative position.

This makes it possible to classify a plurality of clusters into the reference cluster and the non-reference cluster using the simple reclustering process.

In the image processing device, the information acquisition section may acquire the coordinate information based on an image photographed by an identical user.

This makes it possible to assign a keyword that reflects the preference or the like of an identical user.

In the image processing device, the keyword assignment section may assign a keyword to the photographed image to which the keyword has been assigned to update the keyword.

This makes it possible to assign the latest keyword that reflects a change in preference or the like of the user.

According to another embodiment of the invention, there is provided an information storage device storing a program that causes a computer to function as:

an information acquisition section that acquires a photographing position of a photographed image or a position of an imaging device as coordinate information;

a distribution state acquisition section that acquires a distribution state of a plurality of pieces of coordinate information acquired as the coordinate information; and a keyword assignment section that assigns a keyword that corresponds to the acquired distribution state to the photographed image.

According to another embodiment of the invention, there is provided an image processing method comprising:

acquiring a photographing position of a photographed image or a position of an imaging device as coordinate information;

acquiring a distribution state of a plurality of pieces of coordinate information acquired as the coordinate information; and assigning a keyword that corresponds to the acquired distribution state to the photographed image.

Exemplary embodiments of the invention are described below. Note that the following exemplary embodiments do not in any way limit the scope of the invention laid out in the claims. Note also that all of the elements of the following exemplary embodiments should not necessarily be taken as essential elements of the invention.

1. First Embodiment

A first embodiment illustrates a process that determines whether an image among a plurality of images was photographed within a range where the user performs normal daily activities (i.e., the normal activity range of the user), or photographed in a distant place, based on the photographing position of the image, and assigns a corresponding keyword to the image. For example, a keyword "travel" is automatically assigned to a photograph that was taken during long-distance travel by the user who takes photographs in daily life.

FIG. 1 is a view illustrating the configuration of an image processing device according to the first embodiment. As illustrated in FIG. 1, the image processing device includes a processing section 100, an input section 200, a storage section 300, and a display section 400. The processing section 100, the input section 200, the storage section 300, and the display section 400 are connected to each other.

The processing section 100 performs various processes based on information input from the input section 200 and information stored in the storage section 300. The function of the processing section 100 may be implemented by hardware such as a processor (e.g., CPU) or an ASIC (e.g., gate array), a program, or the like.

The input section 200 allows the user to input operation information about the image processing device, for example. The input section 200 may be implemented by a button, a GUI, or the like.

The storage section 300 serves as a work area for the processing section 100 and the like. The function of the storage section 300 may be implemented by a memory (e.g., RAM), a hard disk drive (HDD), or the like.

The display section 400 displays a display screen. The display section 400 may be implemented by a liquid crystal display, an organic EL display, or the like.

The processing section 100 includes an information acquisition section 110, a distribution state acquisition section 120, a keyword assignment section 130, and a map presentation section 150.

The information acquisition section 110 acquires coordinate information. For example, the information acquisition section 110 acquires two-dimensional coordinate information (e.g., X-axis/Y-axis coordinate information or latitude/longitude information) that represents a geographical position. The coordinate information is acquired at an image acquisition timing, for example. Note that the coordinate information may also be acquired at a timing other than the image acquisition timing. In the first embodiment, the information acquisition section 110 acquires latitude/longitude information that is acquired using the GPS or the like. Note that the coordinate information acquisition means is not limited to the GPS. When the image processing device is provided with a WiFi function, the coordinate information may be acquired using known technology such as the PlaceEngine technology. The information acquisition section 110 may acquire altitude information in addition to the latitude/longitude information.

The distribution state acquisition section 120 acquires the distribution state of the coordinate information. More specifically, the distribution state acquisition section 120 clusters (classifies) a plurality of pieces of coordinate information into two clusters, and calculates distance information about the distance between the clusters to acquire the distribution state (as described below in connection with a cluster classification section 125 and a distance information acquisition section 126).

The distribution state acquisition section 120 includes the cluster classification section 125 and the distance information acquisition section 126. The cluster classification section 125 clusters (classifies) a plurality of pieces of coordinate information. In the first embodiment, the cluster classification section 125 classifies a plurality of pieces of coordinate information into a first cluster and a second cluster. The cluster classification section 125 sets one of the first cluster and the second cluster to be a reference cluster, and sets the other of the first cluster and the second cluster to be a non-reference cluster. The distance information acquisition section 126 acquires a cluster-to-cluster distance that indicates the distance between the reference cluster and the non-reference cluster.

The keyword assignment section 130 assigns a keyword to the acquired image as metadata. In the first embodiment, a keyword based on a geographical position is assigned to the acquired image. For example, a keyword that reflects the environment or the preference of the user may be assigned to the acquired image. A keyword that does not take account of the preference or the like of the user (e.g., a place name such as "Tokyo") may also be assigned to the acquired image.

Figure 5:
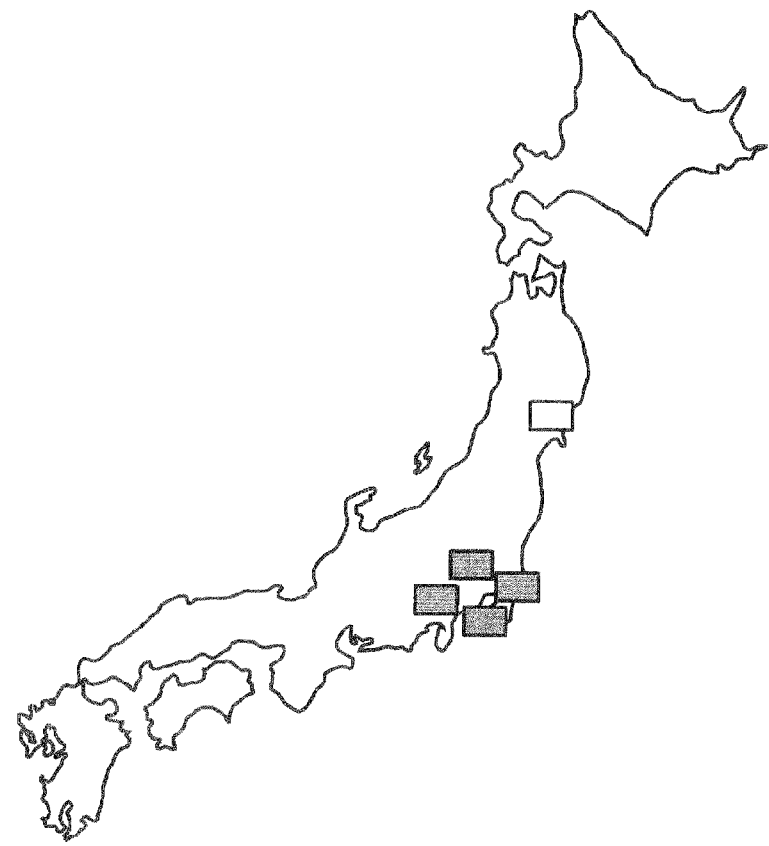
FIG. 5 illustrates an example of screen data in which a thumbnail is displayed on a map.

The map presentation section 150 displays an image on a two-dimensional map as a thumbnail. More specifically, the map presentation section 150 generates an image as illustrated in FIG. 5, and presents the generated image to the user.

The process according to the first embodiment is described in detail below with reference to FIG. 2. In a step S501, the information acquisition section 110 acquires the coordinate information. In the first embodiment, the information acquisition section 110 acquires the latitude/longitude information using the GPS or a WiFi function.

The cluster classification section 125 included in the distribution state acquisition section 120 performs a clustering process on the acquired coordinate information (latitude/longitude information) as a vector group in a two-dimensional coordinate space to classify the coordinate information into the first cluster and the second cluster (S502). Note that each cluster includes at least one piece of coordinate information. A normal clustering method such as k-means clustering may be used as the clustering method. The information (image) illustrated in FIGS. 3A and 3B is acquired by the above process.

The cluster classification section 125 then classifies the first cluster and the second cluster into the reference cluster and the non-reference cluster (S503). More specifically, the cluster classification section 125 compares the number of images included in the first cluster and the number of images included in the second cluster, and sets the first cluster or the second cluster in which the number of images is larger than that of the other, to be the reference cluster. In the example illustrated in FIGS. 3A to 3C, the first cluster is set to be the reference cluster, and the second cluster is set to be the non-reference cluster.

Figure 4:
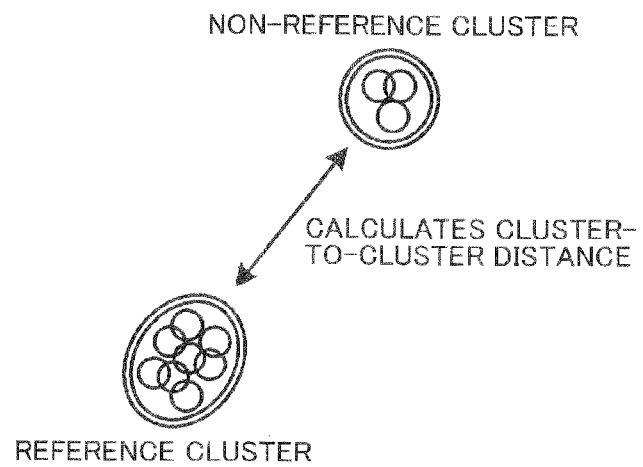
FIG. 4 is a view illustrating a cluster-to-cluster distance.

The distance information acquisition section 126 then calculates the cluster-to-cluster distance between the reference cluster and the non-reference cluster (see FIG. 4) (S504). In the first embodiment, the Euclidean distance between the center of gravity (i.e., the average coordinates of the photographing positions) of the reference cluster and the center of gravity of the non-reference cluster is calculated using the following expressions (1) to (3).

$$d = \sqrt{dx^2 + dy^2} \qquad (1)$$

$d$: Cluster-to-cluster distance $dx, dy$: Differences in distance in $x$ and $y$ directions in two-dimensional coordinate space $$dx = m_{1x} - m_{2x}, \; dy = m_{1y} - m_{2y} \qquad (2)$$

$m_{1x}, m_{1y}$: $x$ and $y$ components of center-of-gravity coordinates of reference cluster $m_{2x}, m_{2y}$: $x$ and $y$ components of center-of-gravity coordinates of non-reference cluster $$m_1 = (m_{1x}, m_{1y}) = \sum_i p_i / N_1 \qquad (3)$$
$$m_2 = (m_{2x}, m_{2y}) = \sum_j p_j / N_2$$

$m_1$: Center-of-gravity coordinate vector of reference cluster $p_i$: $i$th coordinate vector of reference cluster $N_1$: Number of coordinate vectors in reference cluster $m_2$: Center-of-gravity coordinate vector of non-reference cluster $p_j$: $j$th coordinate vector of non-reference cluster $N_2$: Number of coordinate vectors in non-reference cluster Note that another distance calculation method may also be used. For example, the Euclidean distance between the coordinates of the photographing position included in the reference cluster and the coordinates of the photographing position included in the non-reference cluster that are closest to each other, or the average distance between the coordinates of the photographing positions included in the reference cluster and the coordinates of the photographing positions included in the non-reference cluster may be used. Alternatively, the Mahalanobis distance from the center-of-gravity coordinates of the reference cluster to the non-reference cluster (distance from point to distribution), or the Mahalanobis distance from the center-of-gravity coordinates of the non-reference cluster to the reference cluster may be used. It is also possible to use various other processes that calculate the cluster-to-cluster distance.

The distance information acquisition section 126 may calculate the distance between the coordinate vector of each image included in each cluster and the opposite cluster instead of the cluster-to-cluster distance, and the calculated distance may be used when assigning a keyword.

The keyword assignment section 130 assigns a keyword to each image included in each cluster based on the calculated distance information, and stores the keyword (S505). When the cluster-to-cluster distance is long, the keyword assignment section 130 assigns a keyword that represents a long geographical distance (e.g., "far" or "travel") to each image included in the non-reference cluster. In this case, the keyword assignment section 130 may assign a keyword that represents a short geographical distance (e.g., "near" or "vicinity") to each image included in the reference cluster.

When the cluster-to-cluster distance is short, the keyword assignment section 130 assigns a keyword that represents a short geographical distance (e.g., "near" or "vicinity") to each image included in the reference cluster and/or the non-reference cluster. In the first embodiment, whether the distance is short or long is determined using a given (predetermined) threshold value. For example, when a distance of 300 km on the map is set as the threshold value, a keyword such as "travel" is assigned to each image included in the non-reference cluster when the distance from the reference cluster to the non-reference cluster is equal or longer than 300 km.

A keyword "travel" is thus automatically assigned to only the photographs that were taken by the user during long-distance travel.

The image processing device performs the above process again at a timing at which the number of photographing positions has increased, a timing arbitrarily set by the user, a timing at which a given time has elapsed, or the like, and updates the keyword assigned to each image. This makes it possible to assign the latest keyword that reflects a change in lifestyle or preference of the user.

When the map presentation section 150 displays an image on the map as a thumbnail, the process may be changed depending on whether the cluster is the reference cluster or the non-reference cluster. FIG. 5 illustrates a specific example of such a change in process. In FIG. 5, a plurality of images that are positioned on the map within a range equal to or less than a given threshold value are represented by a single thumbnail.

Since it is considered that the reference cluster corresponds to a range where the user performs normal daily activities, a problem may occur if the images distributed in the reference cluster are classified collectively. Specifically, it is desirable for the user who lives in Tokyo that an image photographed in Odaiba and an image photographed in Ikebukuro not be collectively classified as "Tokyo", but be distinguished from each other. This is because Odaiba and Ikebukuro are sufficiently distant from each other for a person who performs normal daily activities in Tokyo, and it is considered that the companion, time, purpose, and the like differ between the case where the user visited Odaiba and the case where the user visited Ikebukuro.

In contrast, the non-reference cluster corresponds to an unusual place outside the range where the user performs daily activities, and it is not considered that the user frequently visits such a place for different purposes and the like. Therefore, a problem rarely occurs when the images distributed in the Tohoku region (see FIG. 5) are collectively classified as "travel to Tohoku", and represented by a single image, even if the images are distributed over a distance equal to or longer than the distance between Odaiba and Ikebukuro.

According to the first embodiment, the image processing device includes the information acquisition section 110 that acquires the coordinate information, the distribution state acquisition section 120 that acquires the distribution state of a plurality of pieces of the acquired coordinate information, and the keyword assignment section 130 that assigns a keyword that corresponds to the distribution state to the photographed image (see FIG. 1).

The image processing device is used together with an imaging device, or is provided in an imaging device. Note that another configuration may also be employed. The coordinate information is information that indicates the position when (at which) the photographed image was photographed using the imaging device, or information that indicates the position of the imaging device acquired at an arbitrary timing (irrespective of whether or not an image was photographed).

This makes it possible to acquire the coordinate information and the distribution state of the coordinate information, and assign a keyword that corresponds to the acquired distribution state to the photographed image. Therefore, a keyword can be assigned to each photographed image corresponding to the distribution of the coordinate information (see FIGS. 3A to 3C, for example). In the example illustrated in FIGS. 3A to 3C, it is possible to acquire information that indicates that the images were mainly photographed in Tokyo, and some images were photographed in the Tohoku region, by acquiring the distribution state (in FIG. 3A, the lower area that has many small circles is around Tokyo, and the upper area that has only three small circles is around Tohoku region). Therefore, a keyword that can be assigned to the photographed image is not limited to a keyword (e.g., "Tokyo" or "Tohoku") that is common to each user. Specifically, it is possible to assign a keyword that reflects the place of residence, the activity range, or the preference of the user (e.g., assign a keyword "near", "vicinity", or "usual" to an image photographed in Tokyo, and assign a keyword "far", "ravel", or "unusual" to an image photographed in the Tohoku region: The distance of Tokyo to Tohoku region is 300 km or more).

The image processing device assigns a keyword to an image. A search process and a display process can be efficiently performed by assigning metadata to an image. Note that a keyword may be assigned to the coordinate information acquired at a timing other than the timing at which the image was photographed. FIG. 6 illustrates a data structure according to the first embodiment. The coordinate information is normally linked to image data as metadata, and a keyword is linked to the coordinate information as metadata (see A1 in FIG. 6). A keyword may also be linked to the coordinate information acquired at a timing at which an image was not photographed (image data=NULL) (see A2 in FIG. 6). The above configuration is useful since the keyword can be used as the metadata about the coordinate information when it is necessary to perform data processing using the coordinate information, for example.

The distribution state acquisition section 120 may acquire the distribution state of the coordinate information in a two-dimensional coordinate space that represents a geographical position.

This makes it possible to use a geographical position (e.g., longitude/latitude) as the coordinate information. A geographical position may be acquired using the GPS or a WiFi function, for example.

The distribution state acquisition section 120 may include the cluster classification section 125 that classifies the coordinate information into a plurality of clusters that include at least the first cluster and the second cluster.

This makes it possible to classify a plurality of pieces of coordinate information into a plurality of clusters using the clustering process. In the first embodiment, the coordinate information is classified into the first cluster and the second cluster (see FIG. 3B). Note that the coordinate information may be classified into three or more clusters, as described later in connection with a fourth embodiment (see FIG. 12). It is possible to acquire information about the distribution state of the coordinate information by performing the clustering process.

Figure 3C:
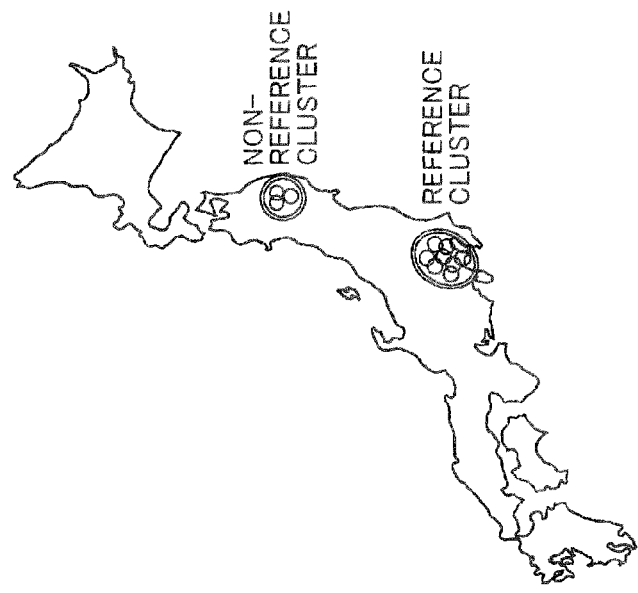
FIGS. 3A to 3C illustrate an example of the distribution of coordinate information.
Figure 3B:
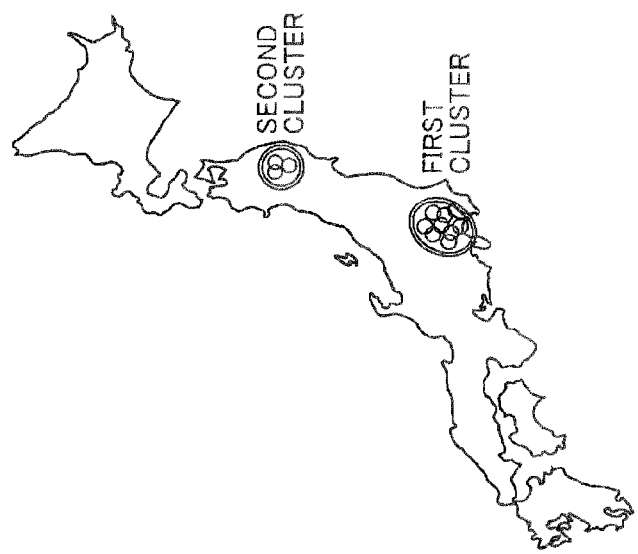
Figure 3A:

The cluster classification section 125 may classify the first cluster and the second cluster into the reference cluster (i.e., a cluster that serves as a reference) and the non-reference cluster (i.e., a cluster that does not serve as a reference) (see FIG. 3C).

This makes it possible to further classify the coordinate information that has been classified into the plurality of clusters depending on whether or not the coordinate information serves as a reference. It is possible to determine whether or not the user performs normal daily activities in the determination target region by classifying the coordinate information into the reference cluster and the non-reference cluster, so that a keyword that takes account of the preference or the like of the user can be assigned.

The cluster classification section 125 may classify a cluster among the plurality of clusters that includes the largest number of photographed images as the reference cluster.

This makes it possible to classify a cluster that includes the largest number of photographed images as the reference cluster. It is likely that the user spent much time within a range included in the cluster that includes the largest number of photographed images. There may be a case where the user does not take many photographs in daily life, but takes a large number of photographs during travel. In such a case, the coordinate information may regularly be acquired even when the user does not take a photograph (i.e., when the imaging device is set to a sleep state), and a cluster that includes the largest number of pieces of coordinate information may be set as the reference cluster. In either case, since the reference cluster can be determined based on the number of elements included in each cluster, the process can be simplified.

The cluster classification section 125 may set the reference cluster based on a time-series transition history of the coordinate information in the two-dimensional coordinate space that represents a geographical position.

This makes it possible to set the reference cluster based on the time-series transition history of the coordinate information. The time-series transition history of the coordinate information may be information obtained by connecting a plurality of pieces of coordinate information in time series using a straight line, for example. It is considered that the user moves from home to the travel destination, and returns to home from the travel destination. Specifically, the user's home is considered to be the center ("hub") of the radial figure illustrated in FIG. 7, provided that a case where the user moves from one travel destination to another travel destination is excluded. Therefore, a figure as illustrated in FIG. 7 may be generated, and the cluster that serves as a hub may be set to be the reference cluster. For example, the number of entrances into the cluster (or the number of exits from the cluster, or the sum of the number of entrances into the cluster and the number of exits from the cluster) may be counted, and the cluster for which the counted number is a maximum may be set to be the reference cluster.

The cluster classification section 125 may set the reference cluster based on the complexity of the distribution of the coordinate information in the first cluster and the complexity of the distribution of the coordinate information in the second cluster.

Note that the complexity of the distribution of the coordinate information increases when the coordinate information is dispersed over a wide range (see FIG. 8A), and decreases when the coordinate information is closely distributed within a narrow range, or distributed linearly (see FIG. 8B). A specific example of the complexity calculation method is described below.

The above configuration makes it possible to set the reference cluster based on the complexity of the distribution of the coordinate information. Specifically, while it is considered that the user randomly moves to various places in the reference cluster in which the user performs normal daily activities, it is considered that the user moves in a relatively simple manner (e.g., moves linearly) in the non-reference cluster (e.g., travel destination).

The complexity may be calculated by utilizing the sum of the absolute values of the angles formed by the line segments that connect the adjacent points when connecting a plurality of pieces of coordinate information in time series, the sum of the length of each line segment, or the like as a parameter. It is considered that the coordinate information is distributed linearly (see FIG. 8B) when the sum of the absolute values of the angles formed by the line segments that connect the adjacent points is small, and the coordinate information is closely distributed within a narrow range when the sum of the length of each line segment is small. In such a case, the cluster is classified as the non-reference cluster.

The complexity may also be calculated as follows. Specifically, a given width is provided to the line segments that connect the adjacent points when connecting a plurality of pieces of coordinate information in time series, and the ratio of the total area of the line segments to the area of the cluster is calculated. The ratio of the total area of the line segments to the area of the cluster increases when the movement is complex, and decreases when the movement is simple. For example, the area that corresponds to each line segment may be blacked out in the image that represents the cluster (white pixels), and the ratio of the number of black pixels to the number of white pixels may be calculated. Note that the ratio of the total area of the line segments to the area of the cluster increases even if the movement is simple when a large number of pieces of coordinate information are distributed within a narrow area (range). Therefore, the calculated area may be corrected using the area of the cluster and the number of pieces of coordinate information included in the cluster.

The image processing device may include the map presentation section 150 that displays a thumbnail of a plurality of images acquired as the photographed image on a map. The map presentation section 150 may display a single representative image among a plurality of images as the thumbnail when the geographical distance between the photographing positions is less than a given threshold value. The map presentation section 150 may set the threshold value that corresponds to the non-reference cluster to be larger than the threshold value that corresponds to the reference cluster.

This makes it possible to present an image as illustrated in FIG. 5 to the user, for example. In FIG. 5, the reference cluster is set around Tokyo, and the non-reference cluster is set to the Tohoku region (see FIG. 3C). A plurality of images within a given range are represented by a single thumbnail. In this case, the threshold value that corresponds to the non-reference cluster is set to be larger than the threshold value that corresponds to the reference cluster. Specifically, a plurality of images included in the non-reference cluster are represented by a single thumbnail, and the range represented by a single thumbnail in the reference cluster is narrower than that of the non-reference cluster. This is because it is considered that a plurality of points are situated within a narrow range in the reference cluster in which the user performs normal daily activities. For example, Odaiba, Ikebukuro, Shinagawa, and Jiyugaoka are situated close to each other in Tokyo. However, since the user visits these places for different purposes, these places should be distinguished from each other. In contrast, it is considered that a problem does not occur even if the entire Tohoku region (non-reference cluster) is represented by a single thumbnail (e.g., "travel to Tohoku"), for example.

The keyword assignment section 130 may assign a place name that represents a narrow region to each image included in the reference cluster as compared with each image included in the non-reference cluster when assigning a place name that corresponds to the photographing position to the photographed image as the keyword.

The expression "place name that represents a narrow region" means that the area of the region represented by the place name is narrower than that of the comparison target, for example. For example, the name that represents a narrow region is "Tokyo" with respect to "Japan", or "Shibuya-ku" with respect to "Tokyo", or "Shibuya" or "Ebisu" with respect to "Shibuya-ku". Note that a regional name or the like that is not used for the address (e.g., country, prefecture, city, town, and house number) may also be used. The place name that represents a wide region and the place name that represents a narrow region need not necessarily have an inclusive relationship. For example, the term "Tohoku" that represents a region represents a region wider than that represented by the term "Tokyo" that represents a city.

The above configuration makes it possible to set the granularity of the keyword corresponding to whether the cluster is the reference cluster or the non-reference cluster. Specifically, while it is necessary to appropriately use a detailed place name for the reference cluster in order to reflect the preference of the user, it suffices to use a broad place name (e.g., "Tohoku" or "Iwate") for the non-reference cluster.

The distribution state acquisition section 120 may include the distance information acquisition section 126 (see FIG. 1), and the keyword assignment section 130 may assign a keyword to the photographed image based on the distance information. For example, when the distance between the reference cluster and the non-reference cluster is long, the keyword assignment section 130 assigns a keyword that represents a long distance (e.g., "far", "travel", "exceptional", or "rare") to the photographed image included in the non-reference cluster.

This makes it possible to acquire the cluster-to-cluster distance between the reference cluster and the non-reference cluster, and set a keyword based on the acquired distance information. A threshold value that is used to determine that the distance information indicates that the non-reference cluster is distant from the reference cluster may be arbitrarily set. For example, when a child has moved by a distance of about several tens of kilometers, it is considered that he is in an unusual environment. In contrast, an active adult may not consider that he is in an unusual environment unless he moves by about several hundred kilometers. Specifically, a keyword should be assigned based on the cluster-to-cluster distance information, and it is desirable to set the threshold value on a user basis.

The information acquisition section 110 may acquire the coordinate information based on an image photographed by an identical user.

This makes it possible to appropriately reflect the activity range, the preference, and the like of the user in the keyword. When a plurality of users use an identical image processing device (or an identical imaging device that includes the image processing device), the activity range, the preference, and the like of each user may be reflected in the keyword in combination.

The keyword assignment section 130 may assign a keyword to the photographed image to which a keyword has been assigned to update the keyword.

In this case, the distribution state acquisition section 120 may update the distribution state of the coordinate information.

This makes it possible to update the keyword. For example, the reference cluster may be updated when the daily activity range has changed due to a move, an increase in activity range, or the like, and the keyword may be updated accordingly.

The first embodiment also relates to a program that causes a computer to function as the information acquisition section 110, the distribution state acquisition section 120, and the keyword assignment section 130.

This makes it possible to implement the image processing device according to the first embodiment by means of software instead of hardware. For example, the imaging device may be used independently instead of providing the image processing device in the imaging device, and only data obtained by the imaging device may be input to an information processing device such as a PC, and subjected to image processing using the program. The program is stored in an information storage device. The information storage device may be an arbitrary recording device that is readable by an information processing device, such as an optical disk (e.g., DVD and CD), a magnetooptical disk, a hard disk (HDD), and a memory (e.g., nonvolatile memory and RAM).

2. Second Embodiment

A second embodiment illustrates an example in which the user selects the reference cluster, and a keyword is assigned based on the reference cluster selected by the user. In this case, since the user can set the desired range to be the reference cluster by performing the selection operation, a keyword that appropriately reflects the preference of the user can be assigned.

FIG. 1 illustrates the configuration of an image processing device according to the second embodiment. The configuration of each section is the same as the configuration of each section according to the first embodiment. The second embodiment differs from the first embodiment in that the cluster classification section 125 sets the reference cluster and the non-reference cluster according to an operation input performed by the user.

Figure 9:
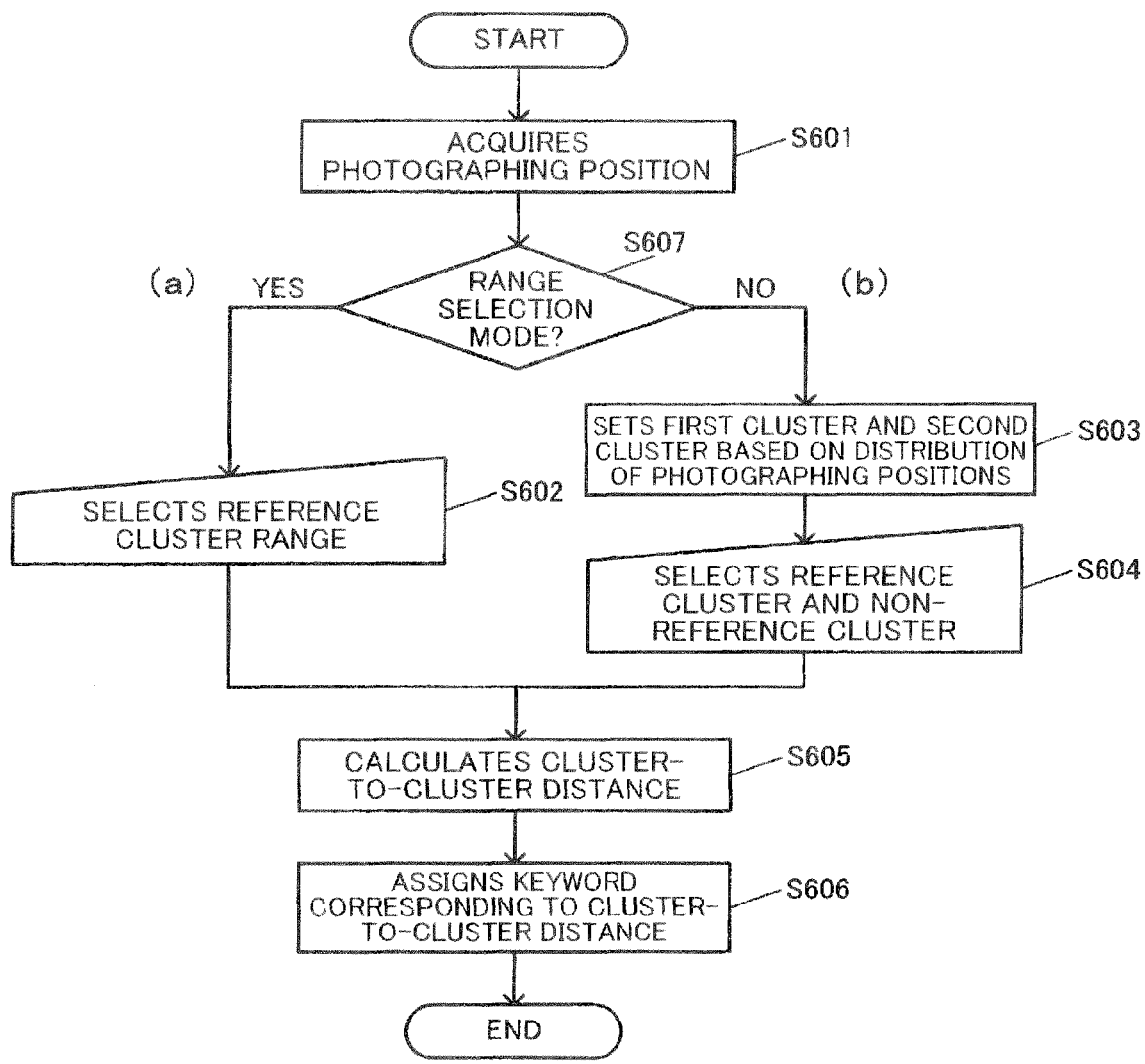
FIG. 9 is a flowchart illustrating a process according to a second embodiment.

The process according to the second embodiment is described in detail below with reference to FIG. 9. In a step S601, the coordinate information is acquired. The coordinate information is acquired in the same manner as in the first embodiment. Therefore, detailed description thereof is omitted.

Figure 10A:
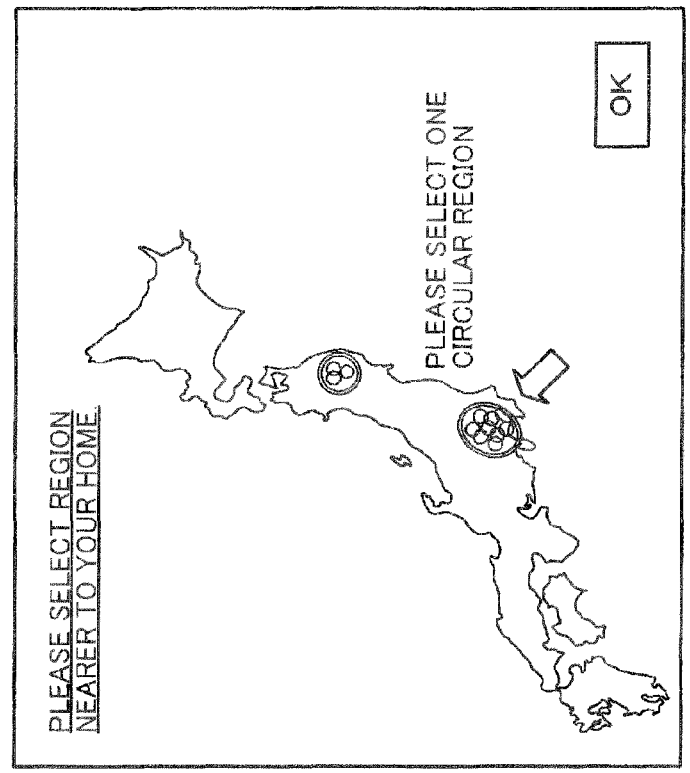
FIGS. 10A and 10B illustrate an example of screen data displayed when determining a reference cluster based on selection by the user.

In a step S607, whether or not the mode is set to a range selection mode is determined When the mode is set to a range selection mode, the cluster classification section 125 displays map information and photographing positions as illustrated in FIG. 10A on an information presentation device (e.g., display) provided in the display section, and allows the user to select a range on the map that is set to be the reference cluster using a user interface (UI) (e.g., mouse) provided to the input section (S602). In this case, a range selected by the user may be widened circularly when the user moves (drags) a pointer, or an area enclosed by a freehand operation may be set as the selected range. It is also possible to prompt the user to input address information, and select a given range around the input address as the reference cluster. Although the coordinate information is displayed in FIG. 10A, the coordinate information need not necessarily be displayed on the map.

When it has been determined that the mode is not set to the range selection mode in the step S607, the first cluster and the second cluster are set based on the distribution of the coordinate information in the same manner as in the first embodiment (S603).

Figure 10B:
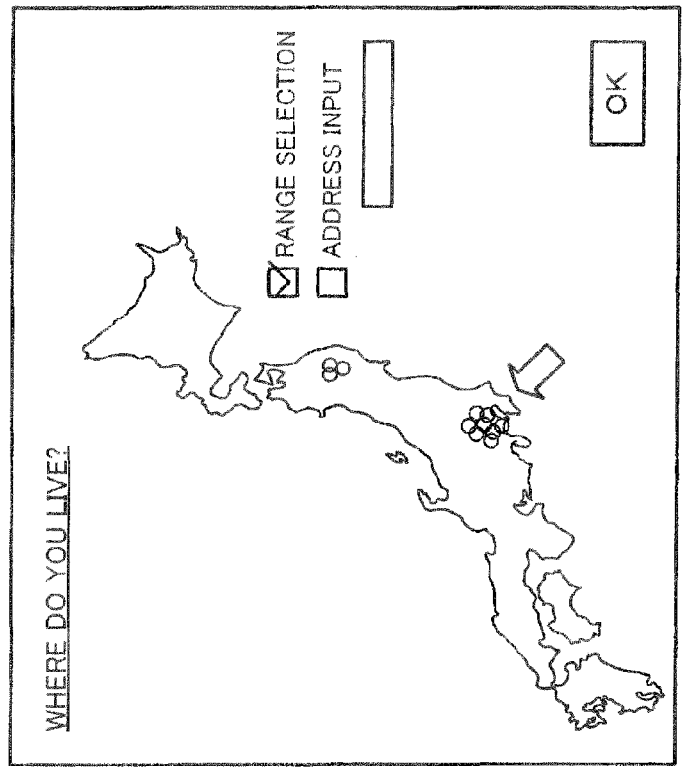

The cluster classification section 125 displays a screen as illustrated in FIG. 10B, and allows the user to select the first cluster or the second cluster as the reference cluster (S604).

The distance information acquisition section 126 acquires the cluster-to-cluster distance in the same manner as in the first embodiment (S605). The keyword assignment section 130 assigns a keyword corresponding to the cluster-to-cluster distance (S606). The keyword assignment process is basically performed in the same manner as in the first embodiment. Note that it is possible to allow the user to select the threshold value used to determine whether the cluster-to-cluster distance is short or long.

A keyword is thus assigned using the range selected by the user as a reference (i.e., a keyword that appropriately reflects the preference of the user can be assigned).

According to the second embodiment, the cluster classification section 125 may set the reference cluster based on selection by the user (see FIGS. 10A and 10B).

This makes it possible to set a reference cluster that appropriately reflects the preference of the user. For example, a method that allows the user to select a range, or input his address before performing the clustering process (see FIG. 10A), or a method that allows the user to select the reference cluster after performing the clustering process (see FIG. 10B), may be employed. It is also possible to prompt the user to input his address after performing the clustering process, and set the cluster that is closest to the input address to be the reference cluster.

3. Third Embodiment

A third embodiment illustrates an example in which a more advanced keyword assignment process is performed by utilizing a time axis in addition to the position information on the map that is represented by two-dimensional coordinates.

Figure 2:
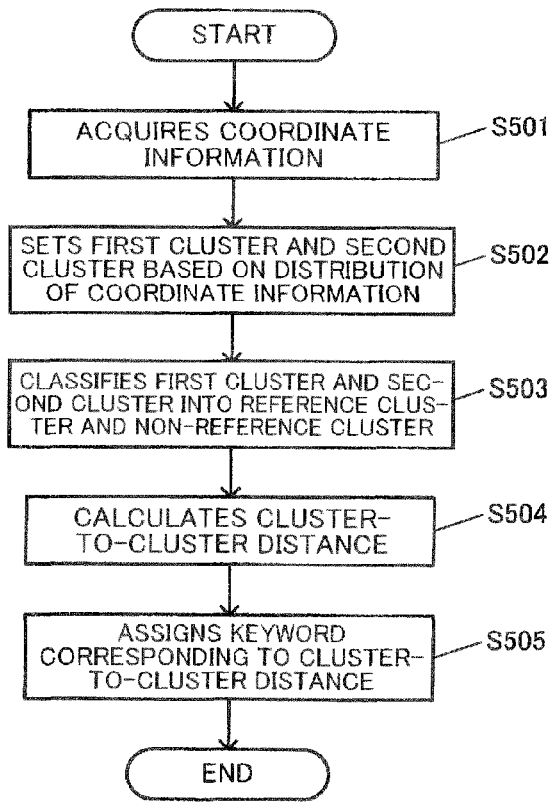
FIG. 2 is a flowchart illustrating a process according to a first embodiment.

FIG. 1 illustrates the configuration of an image processing device according to the third embodiment, and FIG. 2 illustrates the details of the process according to the third embodiment. The configuration of the image processing device according to the third embodiment and the process according to the third embodiment are basically the same as those according to the first embodiment. The differences from the first embodiment operation are described below with reference to FIG. 2.

In a step S501, the coordinate information is acquired. The information acquisition section 110 acquires coordinate information about the geographical photographing positions of a plurality of images. More specifically, the information acquisition section 110 acquires latitude/longitude information that is acquired using the GPS or the like as the coordinate information. In the third embodiment, the information acquisition section 110 acquires the photographing time in addition to the latitude/longitude information. The coordinate information is obtained as the coordinates in the two-dimensional coordinate space (longitude/latitude) and the one-dimensional coordinate space (time).

The first cluster and the second cluster are set based on the coordinate information (S502). In this case, the first cluster and the second cluster are set using the geographical two-dimensional coordinate information without using the one-dimensional coordinate space (time).

In a step S503, the first cluster and the second cluster are classified into the reference cluster and the non-reference cluster in the same manner as in the first embodiment. The cluster-to-cluster distance is then calculated (S504). More specifically, the distance in the two-dimensional coordinate space (longitude/latitude) and the distance in the one-dimensional coordinate space (time axis) are calculated.

The keyword assignment section 130 assigns a keyword to each image included in each cluster corresponding to the cluster-to-cluster distance, and stores the keyword. The keyword assignment section 130 assigns a keyword "past" or the like when the time-axis distance is long, and assigns a keyword "latest" or the like when the time-axis distance is short. Alternatively, the distance in the two-dimensional coordinate space (longitude/latitude) and the time-axis distance may be determined, and keywords (e.g., "past" and "travel", or "latest" and "vicinity") that take account of the position information and the time axis may be assigned.

Note that the two-dimensional coordinate space (longitude/latitude) and the one-dimensional coordinate space (time) may be used to calculate the distance in combination instead of independently using the two-dimensional coordinate space (longitude/latitude) and the one-dimensional coordinate space (time). For example, the coordinates of each photographing position are obtained as the coordinates in a three-dimensional coordinate space (longitude/latitude/time) (see FIG. 11).

The vectors in the three-dimensional coordinate space are also used when setting the first cluster and the second cluster. The three-dimensional coordinate space is also used when the distance information acquisition section 126 acquires the distance information.

The keyword assignment section 130 assigns a keyword "far" or the like when the distance in the three-dimensional coordinate space is long, and assigns a keyword "near" or the like when the distance in the three-dimensional coordinate space is short taking account of the geographical distance and the time-axis distance.

The above configuration makes it possible to assign a keyword using the time axis (i.e., assign a keyword that reflects a temporal change in lifestyle or preference of the user).

When the image processing device performs the above process again at a timing at which the number of photographing positions has increased, a timing arbitrarily set by the user, a timing at which a given time has elapsed, or the like, and updates the keyword assigned to each image, the image processing device may perform a process that takes account of the passage of time (e.g., may update a keyword "latest" with a keyword "past").

According to the third embodiment, the information acquisition section 110 may acquire time information in addition to the coordinate information. The distribution state acquisition section 120 may acquire the distribution state of the coordinate information and the time information in the three-dimensional coordinate space, and the keyword assignment section 130 may assign a keyword that represents information about time.

The time information is information that indicates the time when the information about the photographing position of the photographed image or the position of the imaging device has been acquired.

Figure 11:
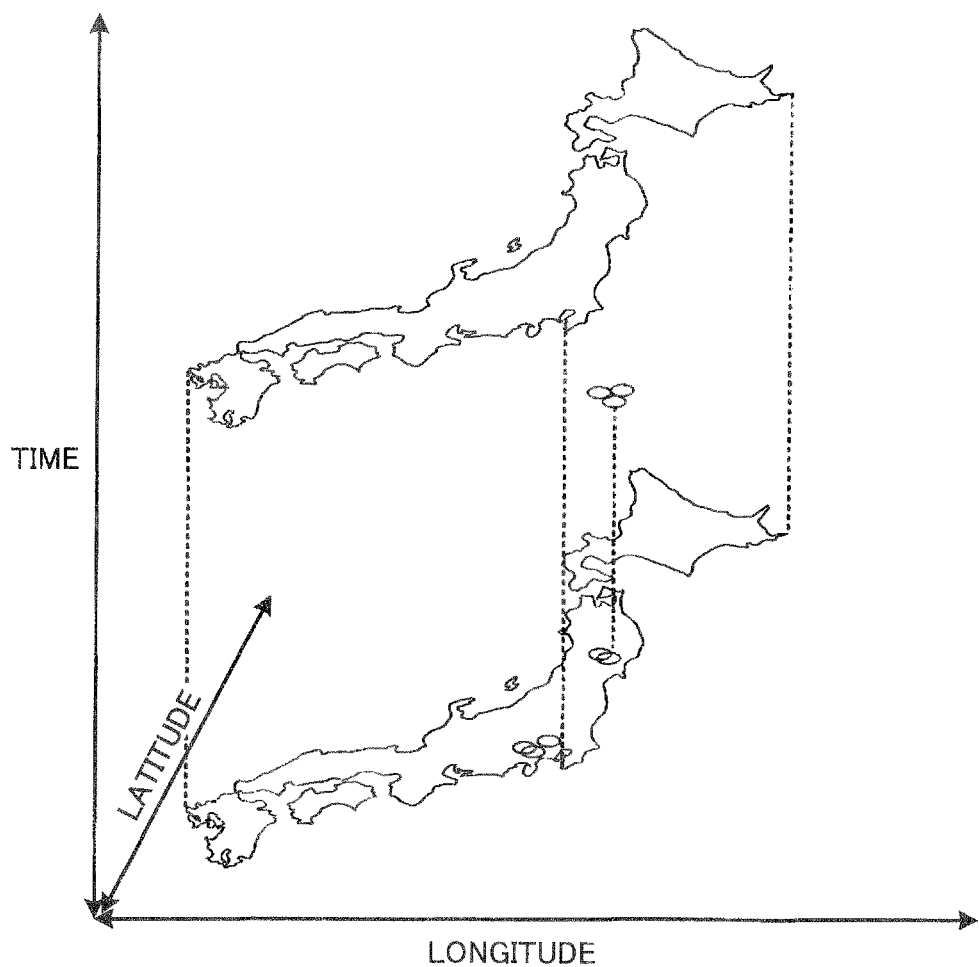
FIG. 11 illustrates an example of a three-dimensional coordinate space (longitude/latitude/time).

The above configuration makes it possible to assign a keyword that takes account of the longitude, the latitude, and the time (see FIG. 11). For example, it is possible to assign a keyword "latest", "past", or the like, or assign a keyword "latest travel", "second travel", or the like utilizing the latitude/longitude information.

The keyword assignment section 130 may change a threshold value used to determine the temporal distance depending on the cluster is the reference cluster or the non-reference cluster when assigning a keyword about time to the photographed image.

For example, a small threshold value may be set corresponding to the reference cluster as compared with the non-reference cluster when setting a threshold value used to determine that the temporal distance is short. For example, a keyword "latest" may be assigned to the image included in the reference cluster for which "1 week" is set as the threshold value, and may be assigned to the image included in the non-reference cluster for which "1 month" is set as the threshold value.

This makes it possible to assign a keyword that appropriately reflects the impression of the user. Specifically, since new events occur every day in the normal activity range (reference cluster), the previous events rapidly lose novelty. In contrast, the novelty of the event does not easily wear off with the passage of time in the unusual activity range (non-reference cluster).

The cluster classification section 125 may classify the cluster that has been set to be the non-reference cluster as the reference cluster when the consecutive photographing time of the images included in the non-reference cluster has become equal to or more than a given threshold value.

The consecutive photographing time refers to the time between a time A and a time B when an image that belongs to the non-reference cluster was photographed at the time A, and another image that belongs to the same non-reference cluster was photographed at the time B. Specifically, the expression "the consecutive photographing time has become equal to or more than a given threshold value" is synonymous with the case where the user stayed in one non-reference cluster for a long time.

Therefore, it is possible to determine that the normal activity range has changed due to a move or the like, and change the reference cluster when the consecutive photographing time has become equal to or more than a given threshold value.

4. Fourth Embodiment

A fourth embodiment illustrates a process (i.e., an extension process common to the first to third embodiments) performed when each of the reference cluster and the non-reference cluster includes a plurality of clusters. Although the first to third embodiments illustrate an example in which one reference cluster and one non-reference cluster are set, it is appropriate to use three or more clusters for the process taking account of the actual photographing position distribution.

FIG. 1 illustrates the configuration of an image processing device according to the fourth embodiment.

Figure 12:
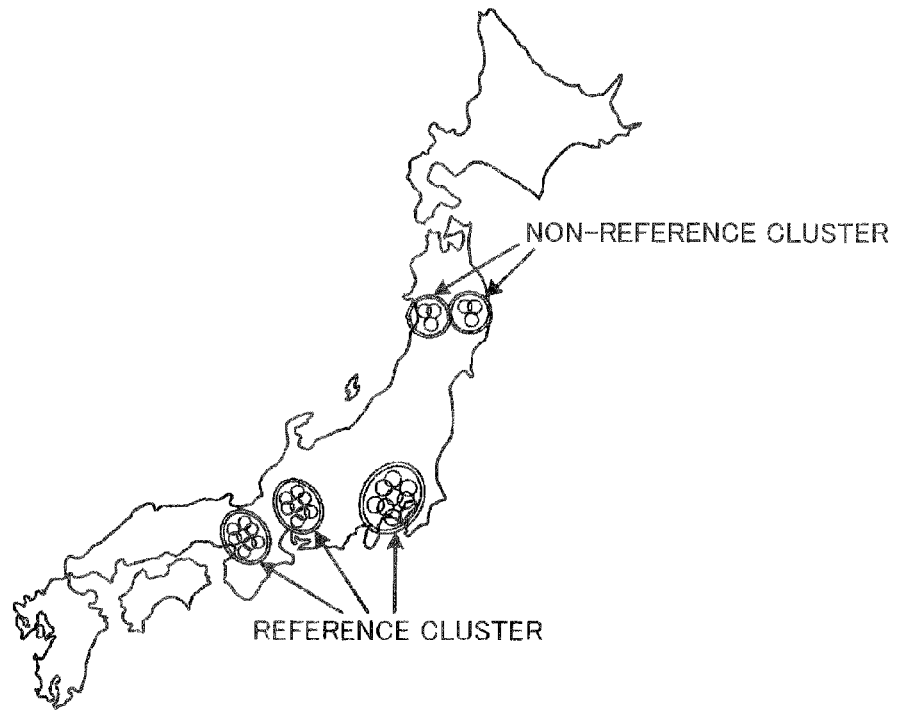
FIG. 12 illustrates an example in which coordinate information is classified into three or more clusters.

FIG. 12 is a schematic view illustrating the configuration according to the fourth embodiment. As illustrated in FIG. 12, three or more clusters are set (five clusters are set in the example illustrated in FIG. 12) instead of setting only the first cluster and the second cluster, and each of the reference cluster and the non-reference cluster includes at least one cluster. In the example illustrated in FIG. 12, the reference cluster includes three clusters, and the non-reference cluster includes two clusters.

Figure 13:
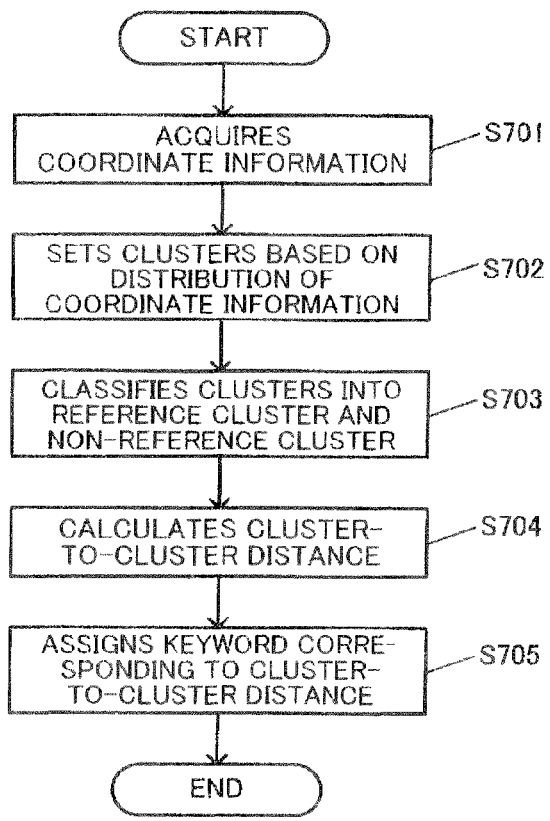
FIG. 13 is a flowchart illustrating a process according to a fourth embodiment.

The process according to the fourth embodiment is described in detail below with reference to FIG. 13. In a step S701, the information acquisition section 110 acquires the coordinate information. The information acquisition section 110 acquires the coordinate information in the same manner as in the first embodiment.

The cluster classification section 125 sets clusters based on the distribution of the coordinate information (S702). The clusters may be set using various methods. For example, k-means clustering may be performed while increasing the value k. When using a configuration that allows the user to perform an operation input (see the second embodiment), the user may select the cluster coordinate information. A plurality of clusters are thus set based on the distribution of the coordinate information (see FIG. 12).

The cluster classification section 125 then classifies the clusters into the reference cluster and the non-reference cluster (S703). The clusters may be classified using various methods. For example, k-means clustering (k=2) may be performed on the clusters. The user may select the cluster that is classified as the reference cluster. The clusters are thus classified into the reference cluster and the non-reference cluster (see FIG. 12).

The distance information acquisition section 126 calculates the cluster-to-cluster distance between the reference cluster and the non-reference cluster (S704). The cluster-to-cluster distance is calculated in the same manner as in the first embodiment. The center-of-gravity position determined based on each coordinate information included in each cluster included in the reference cluster may be used as the center-of-gravity position of the reference cluster. A calculation process similar to that described above in connection the first embodiment may be performed using one cluster included in the reference cluster group and one cluster included in the non-reference cluster group.

In a step S705, a keyword is assigned corresponding to the cluster-to-cluster distance in the same manner as in the first embodiment.

The above configuration makes it possible to implement a complex keyword assignment process that can deal with the actual situation.

According to the fourth embodiment, the distribution state acquisition section 120 may include the cluster classification section 125 that classifies the coordinate information into a plurality of clusters that include at least the first cluster and the second cluster. The cluster classification section 125 may classify one or more clusters among the plurality of clusters as the reference cluster, and may classify the remaining clusters as the non-reference cluster.

For example, the representative position of each cluster among the plurality of clusters may be calculated, and the clustering process may be performed again while regarding each cluster as a point that corresponds to the representative position.

The above configuration makes it possible to implement a situation in which each of the reference cluster and the non-reference cluster includes a plurality of clusters (see FIG. 12). When the number of clusters is two (see the first to third embodiments), it is impossible to implement an appropriate clustering process when the user visited a plurality of regions (e.g., when the user who lives in Tokyo visited the Tohoku region and the Kansai region). Since three clusters can be set to Tokyo, the Tohoku region, and the Kansai region by utilizing the method according to the fourth embodiment, it is possible to implement a more appropriate clustering process.

The first to fourth embodiments according to the invention and the modifications thereof have been described above. Note that the invention is not limited to the first to fourth embodiments and the modifications thereof. Various modifications and variations may be made without departing from the scope of the invention. A plurality of elements described in connection with the first to fourth embodiments and the modifications thereof may be appropriately combined to implement various configurations. For example, an arbitrary element may be omitted from the elements described in connection with the first to fourth embodiments and the modifications thereof. Some of the elements described in connection with different embodiments or modifications thereof may be appropriately combined. Various modifications and applications are possible without materially departing from the novel teachings and advantages of the invention.

What is claimed is:

1. An image processing device comprising:
    an information acquisition section that acquires a photographing position of a photographed image or a position of an imaging device as coordinate information;
    a distribution state acquisition section that acquires a distribution state of a plurality of pieces of coordinate information acquired as the coordinate information, wherein the distribution state acquisition section includes a cluster classification section that classifies the coordinate information into a plurality of clusters that include at least a first cluster and a second cluster, and wherein the cluster classification section classifies the first cluster and the second cluster into a reference cluster that serves as a reference and a non-reference cluster that does not serve as a reference; and
    a keyword assignment section that assigns a keyword that corresponds to the acquired distribution state to the photographed image,
    wherein the cluster classification section classifies one of the first cluster and the second cluster as the reference cluster based on one of (i) a number of photographed images, (ii) a selection by a user, (iii) a time-series transition history of the coordinate information in a two-dimensional coordinate space that represents a geographical position, (iv) a complexity of a distribution of coordinates in the first cluster indicated by the coordinate information and a complexity of a distribution of coordinates in the second cluster indicated by the coordinate information, and (v) a geographical distance between photographing positions with respect to a threshold value which is set to be larger for the non-reference cluster than for the reference cluster.

2. The image processing device as defined in claim 1, wherein the distribution state acquisition section acquires the distribution state of the coordinate information in a two-dimensional coordinate space that represents a geographical position.

3. The image processing device as defined in claim 2, wherein:
    the information acquisition section further acquires time information that is information indicating a time when the photographing position of the photographed image or the position of the imaging device has been acquired,
    the distribution state acquisition section acquires the distribution state of the coordinate information and the time information in a three-dimensional coordinate space that includes two-dimensional coordinates that represent a geographical position, and a third axis that represents time, and
    the keyword assignment section assigns a keyword that represents information about time to the photographed image.

4. The image processing device as defined in claim 1, wherein the cluster classification section classifies the one of the first cluster and the second cluster having a larger number of the photographed images as the reference cluster.

5. The image processing device as defined in claim 1, wherein the cluster classification section sets the reference cluster based on the selection by the user.

6. The image processing device as defined in claim 1, wherein the cluster classification section sets the reference cluster based on the time-series transition history of the coordinate information in the two-dimensional coordinate space that represents the geographical position.

7. The image processing device as defined in claim 1, wherein the cluster classification section sets the reference cluster based on the complexity of the distribution of coordinates in the first cluster indicated by the coordinate information and the complexity of the distribution of coordinates in the second cluster indicated by the coordinate information.

8. The image processing device as defined in claim 1, wherein the keyword assignment section assigns a place name that represents a narrow region to the photographed image included in the reference cluster as compared with the photographed image included in the non-reference cluster when assigning a place name that corresponds to the photographing position to a plurality of images acquired as the photographed image as the keyword.

9. The image processing device as defined in claim 1, wherein:
    the information acquisition section further acquires time information that is information indicating a time when the photographing position of the photographed image or the position of the imaging device has been acquired,
    the distribution state acquisition section acquires the distribution state of the coordinate information and the time information in a three-dimensional coordinate space that includes two-dimensional coordinates that represent a geographical position, and a third axis that indicates time, and
    the keyword assignment section changes a threshold value used to determine a temporal distance depending on whether a cluster is the reference cluster or the non-reference cluster when assigning a keyword that represents information about time to the photographed image.

10. The image processing device as defined in claim 1, wherein:
    the information acquisition section further acquires time information that is information indicating a time when the photographing position of the photographed image or the position of the imaging device has been acquired,
    the distribution state acquisition section acquires the distribution state of the coordinate information and the time information in a three-dimensional coordinate space that includes two-dimensional coordinates that represent a geographical position, and a third axis that indicates time, and
    the cluster classification section further classifies a cluster that has been set to be the non-reference cluster as the reference cluster when a consecutive photographing time of images included in the non-reference cluster has become equal to or more than a given threshold value.

11. The image processing device as defined in claim 1, wherein the distribution state acquisition section further includes a distance information acquisition section that acquires distance information about the plurality of clusters, and the keyword assignment section assigns the keyword to the photographed image based on the distance information.

12. The image processing device as defined in claim 1, wherein the distribution state acquisition section further includes a distance information acquisition section that acquires distance information about the plurality of clusters, and the keyword assignment section assigns a keyword that represents a long distance in a coordinate space to the photographed image included in the non-reference cluster when a distance between the reference cluster and the non-reference cluster indicated by the distance information is long.

13. The image processing device as defined in claim 1, wherein the cluster classification section classifies one or more clusters from among the plurality of clusters as the reference cluster, and classifies remaining clusters from among the plurality of clusters as the non-reference cluster.

14. The image processing device as defined in claim 1, wherein the cluster classification section classifies the reference cluster and the non-reference cluster by calculating a representative position of each cluster from among the plurality of clusters, and performing a clustering process again while regarding each cluster among the plurality of clusters as a point that corresponds to a representative position.

15. The image processing device as defined in claim 1, wherein the information acquisition section acquires the coordinate information based on an image photographed by an identical user.

16. The image processing device as defined in claim 1, wherein the keyword assignment section assigns a new keyword to the photo-graphed image to which the keyword has already been assigned to update the keyword.

17. An image processing device comprising:
an information acquisition section that acquires a photographing position of a photographed image or a position of an imaging device as coordinate information;
a distribution state acquisition section that acquires a distribution state of a plurality of pieces of coordinate information acquired as the coordinate information, wherein the distribution state acquisition section includes a cluster classification section that classifies the coordinate information into a plurality of clusters that include at least a first cluster and a second cluster, and wherein the cluster classification section classifies the first cluster and the second cluster into a reference cluster that serves as a reference and a non-reference cluster that does not serve as a reference;
a keyword assignment section that assigns a keyword that corresponds to the acquired distribution state to the photographed image; and
a map presentation section that displays a thumbnail of a plurality of images acquired as the photographed image on a map,
wherein the map presentation section displays a single representative image among the plurality of images on the map as the thumbnail when a geographical distance between the photographing positions is less than a given threshold value, and sets the threshold value that corresponds to the non-reference cluster to be larger than the threshold value that corresponds to the reference cluster.

18. A non-transitory computer-readable storage medium having a program stored thereon, the program being executable to control a computer to function as:
an information acquisition section that acquires a photographing position of a photographed image or a position of an imaging device as coordinate information;
a distribution state acquisition section that acquires a distribution state of a plurality of pieces of coordinate information acquired as the coordinate information, wherein the distribution state acquisition section includes a cluster classification section that classifies the coordinate information into a plurality of clusters that include at least a first cluster and a second cluster, and wherein the cluster classification section classifies the first cluster and the second cluster into a reference cluster that serves as a reference and a non-reference cluster that does not serve as a reference; and
a keyword assignment section that assigns a keyword that corresponds to the acquired distribution state to the photographed image,
wherein the cluster classification section classifies one of the first cluster and the second cluster as the reference cluster based on one of (i) a number of photographed images, (ii) a selection by a user, (iii) a time-series transition history of the coordinate information in a two-dimensional coordinate space that represents a geographical position, (iv) a complexity of a distribution of coordinates in the first cluster indicated by the coordinate information and a complexity of a distribution of coordinates in the second cluster indicated by the coordinate information, and (v) a geographical distance between photographing positions with respect to a threshold value which is set to be larger for the non-reference cluster than for the reference cluster.

19. An image processing method comprising:
acquiring a photographing position of a photographed image or a position of an imaging device as coordinate information;
acquiring a distribution state of a plurality of pieces of coordinate information acquired as the coordinate information, wherein acquiring the distribution state includes classifying the acquired coordinate information into a plurality of clusters that include at least a first cluster and a second cluster, and classifying the first cluster and the second cluster into a reference cluster that serves as a reference and a non-reference cluster that does not serve as a reference; and
assigning a keyword that corresponds to the acquired distribution state to the photographed image,
wherein one of the first cluster and the second cluster is classified as the reference cluster based on one of (i) a number of photographed images, (ii) a selection by a user, (iii) a time-series transition history of the coordinate information in a two-dimensional coordinate space that represents a geographical position, (iv) a complexity of a distribution of coordinates in the first cluster indicated by the coordinate information and a complexity of a distribution of coordinates in the second cluster indicated by the coordinate information, and (v) a geographical distance between photographing positions with respect to a threshold value which is set to be larger for the non-reference cluster than for the reference cluster.

* * * * *